(12) United States Patent
Matsui et al.

(10) Patent No.: US 11,014,186 B2
(45) Date of Patent: May 25, 2021

(54) WIRE FED ARC WELDING METHOD HAVING ABNORMAL ARC OR ABNORMAL SHORT CIRCUIT WELDING STEPS

(71) Applicant: Panasonic Intellectual Property Management Co., Ltd., Osaka (JP)

(72) Inventors: Kaito Matsui, Osaka (JP); Atsuhiro Kawamoto, Hyogo (JP); Junji Fujiwara, Osaka (JP); Akira Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 869 days.

(21) Appl. No.: 15/023,685

(22) PCT Filed: Feb. 2, 2015

(86) PCT No.: PCT/JP2015/000437
§ 371 (c)(1),
(2) Date: Mar. 22, 2016

(87) PCT Pub. No.: WO2015/122144
PCT Pub. Date: Aug. 20, 2015

(65) Prior Publication Data
US 2016/0346864 A1 Dec. 1, 2016

(30) Foreign Application Priority Data
Feb. 14, 2014 (JP) .............................. JP2014-026145

(51) Int. Cl.
*B23K 9/12* (2006.01)
*B23K 9/095* (2006.01)
(Continued)

(52) U.S. Cl.
CPC ............ *B23K 9/125* (2013.01); *B23K 9/0732* (2013.01); *B23K 9/092* (2013.01); *B23K 9/0953* (2013.01); *B23K 9/124* (2013.01); *B23K 9/173* (2013.01)

(58) Field of Classification Search
CPC .......... B23K 9/12; B23K 9/073; B23K 9/095; B23K 9/121; B23K 9/122; B23K 9/123; B23K 9/133; B23K 9/1333; B23K 9/1366
(Continued)

(56) References Cited

U.S. PATENT DOCUMENTS 4,529,864 A 7/1985 Bennett
4,546,234 A 10/1985 Ogasawara et al.
(Continued)

FOREIGN PATENT DOCUMENTS

DE 102006050297 4/2008
JP 60-108179 6/1985
(Continued)

OTHER PUBLICATIONS

International Search Report of PCT application No. PCT/JP2015/000437 dated Apr. 28, 2015.
(Continued)

*Primary Examiner* — Christopher M Koehler
*Assistant Examiner* — Spencer H. Kirkwood
(74) *Attorney, Agent, or Firm* — Wenderoth, Lind & Ponack, L.L.P.

(57) ABSTRACT

An arc welding method preforms reciprocating wire feed so as to alternately perform forward feed and reverse feed. The arc welding method includes a normal arc welding step, a normal short circuit welding step, and an abnormal arc welding step. In the abnormal arc welding step, a short circuit state occurs at a second time point, which is before a lapse of a second period from a first time point at which
(Continued)

an arc state occurs. Further, in the abnormal arc welding step, the reciprocating wire feed continues until a third time point after a lapse of a first period from the second time point. At the third time point, the reciprocating wire feed is stopped and the abnormal arc welding step is completed. From the third time point, the welding wire is decelerated and the reciprocating wire feed is restarted.

11 Claims, 12 Drawing Sheets

(51) Int. Cl.
*B23K 9/073* (2006.01)
*B23K 9/173* (2006.01)
*B23K 9/09* (2006.01)

(58) Field of Classification Search
USPC ........................................................ 219/137
See application file for complete search history.

(56) References Cited

U.S. PATENT DOCUMENTS

| 9,035,220 B2* | 5/2015 | Schorghuber | B23K 9/124 |
| | | | 219/136 |
| 2006/0016792 A1 | 1/2006 | Uecker et al. | |
| 2008/0142493 A1 | 6/2008 | Uecker et al. | |
| 2008/0314884 A1 | 12/2008 | Fujiwara et al. | |
| 2009/0026188 A1 | 1/2009 | Schorghuber | |
| 2011/0248012 A1 | 10/2011 | Fujiwara | |
| 2012/0145691 A1* | 6/2012 | Fujiwara | B23K 9/073 |
| | | | 219/130.31 |
| 2013/0056453 A1 | 3/2013 | Fujiwara | |
| 2014/0021182 A1 | 1/2014 | Peters et al. | |

FOREIGN PATENT DOCUMENTS

| JP | 60-187468 | 9/1985 |
| JP | 62-003275 U | 1/1987 |
| JP | 2007-216268 | 8/2007 |
| JP | 2012-081501 | 4/2012 |
| WO | 2010/116695 | 10/2010 |

OTHER PUBLICATIONS

Indian Examination Report dated Sep. 18, 2019 for the related Indian Patent Application No. 201647026937.

* cited by examiner

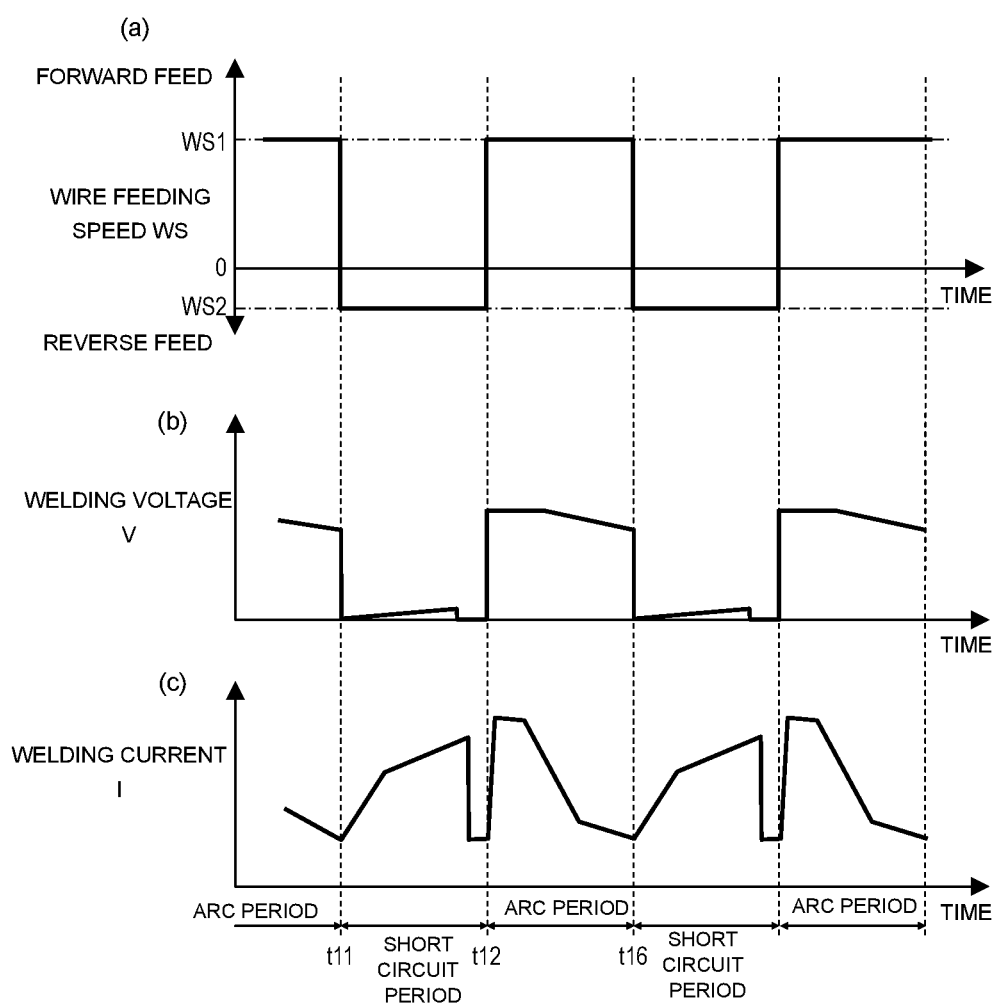

WIRE FED ARC WELDING METHOD HAVING ABNORMAL ARC OR ABNORMAL SHORT CIRCUIT WELDING STEPS

This application is a U.S. national stage application of the PCT international application No. PCT/JP2015/000,437.

TECHNICAL FIELD

The present disclosure relates to an arc welding method for alternately generating a short circuit state and an arc state while feeding a welding wire as a consumable electrode, and more particularly relates to control of a wire feeding speed.

BACKGROUND ART

FIG. 12 is a time chart showing (a) wire feeding speed WS, (b) welding voltage V, and (c) welding current I in a conventional arc welding control method that involves short circuits.

With reference to FIG. 12, when a short circuit occurs at time t11 in an arc period from time t11 to time t12, wire feeding speed WS decelerates from wire feeding speed WS1 as forward feed to wire feeding speed WS2 as reverse feed. Thus, the wire is fed reversely. In the short circuit period, welding current I is increased by current control as time elapses.

When the short circuit is opened at t12 in an arc period from time t12 to time t16, wire feeding speed WS accelerates from wire feeding speed WS2 as reverse feed to wire feeding speed WS1 as forward feed. Thus, the wire is fed forwardly. At the beginning of the arc period, welding current I is increased by current control.

Reversely feeding the wire in a short circuit period as described above reduces the feeding amount of the wire in a short circuit period. This operation opens the short circuit state and generates an arc in a shorter period than the case where the wire is not reversely fed.

Further, after a short circuit is opened, that is, after an arc state is started, the wire is forwardly fed and welding current I is increased at the same time. This operation can burn the wire in a stable manner and form a droplet at the tip of the wire.

The above control can prevent spattering of the wire and irregular short circuit cycles caused by the continuous short circuit state for a long time; thereby achieving cyclic stable welding (see Patent Literature 1, for example).

CITATION LIST

Patent Literature

PTL 1: Japanese Patent Unexamined Publication No. 2007-216268

SUMMARY OF THE INVENTION

In the above conventional wire feeding control, immediately after occurrence of a short circuit, wire feeding speed WS is decelerated from wire feeding speed WS1 as forward feed to wire feeding speed WS2 as reverse feed. In the above conventional wire feeding control, immediately after the short circuit is opened and an arc occurs, wire feeding speed WS is accelerated from wire feeding speed WS2 as reverse feed to wire feeding speed WS1 as forward feed. That is, wire feeding speed WS is controlled depending on the welding state.

However, in the conventional wire feeding control, immediately after a short circuit or an arc is detected, the feeding direction of the wire is inverted. Even in a temporary abnormal phenomenon such as a micro short circuit in an arc period, the feeding direction of the wire is inverted immediately. Thus, when the feeding direction of the wire is inverted in such a temporary abnormal condition, regular and stable arc welding cannot be performed.

In order to address the above problem, an arc welding method of the present disclosure preforms reciprocating wire feed so as to alternately perform forward feed for feeding a welding wire toward an object to be welded and reverse feed for feeding the welding wire in a direction opposite the forward feed. Then, a short circuit state and an arc state are alternately generated between the welding wire and the object to be welded. The arc welding method of the present disclosure includes a normal arc welding step, a normal short circuit welding step, and an abnormal arc welding step. In the normal arc welding step, an arc state continues for a first determination period or longer while the welding wire is fed in the reciprocating wire feed. In the normal short circuit welding step, a short circuit state continues for a second determination period or longer while the welding wire is fed in the reciprocating wire feed. In the abnormal arc welding step, a short circuit state occurs at a second time point, which is before a lapse of a second determination period from a first time point at which an arc state occurs. Further, in the abnormal arc welding step, the reciprocating wire feed continues until a third time point after a lapse of a first period from the second time point. At the third time point, the reciprocating wire feed is stopped and the abnormal arc welding step is completed. From the third time point, the welding wire is decelerated and the reciprocating wire feed is restarted.

Another arc welding method of the present disclosure preforms reciprocating wire feed so as to alternately perform forward feed for feeding a welding wire toward an object to be welded and reverse feed for feeding the welding wire in a direction opposite the forward feed. Then, a short circuit state and an arc state are alternately generated between the welding wire and the object to be welded. The arc welding method of the present disclosure includes a normal arc welding step, a normal short circuit welding step, and an abnormal short circuit welding step. In the normal arc welding step, an arc state continues for a first determination period or longer while the welding wire is fed in the reciprocating wire feed. In the normal short circuit welding step, a short circuit state continues for a second determination period or longer while the welding wire is fed in the reciprocating wire feed. In the abnormal short circuit welding step, an arc state occurs at a fifth time point, which is before a lapse of the second determination period from a fourth time point at which a short circuit state is started. Further, in the abnormal short circuit welding step, the reciprocating wire feed continues until a sixth time point after a lapse of a second period from the fifth time point. At the sixth time point, the reciprocating wire feed is stopped and the abnormal short circuit welding step is completed. From the sixth time point, the welding wire is accelerated and the reciprocating wire feed is restarted.

As described above, in accordance with the present disclosure, continuing the wire feed of the welding wire for a fixed period even in a temporary abnormal phenomenon allows stable arc welding. Further, controlling the feed of the welding wire after a lapse of the fixed period can reduce recurrence of the temporary abnormal phenomenon.

BRIEF DESCRIPTION OF DRAWINGS

FIG. 12 is a time chart showing (a) a wire feeding speed, (b) a welding voltage, and (c) a welding current in a conventional arc welding control method.

DESCRIPTION OF EMBODIMENTS

Hereinafter, exemplary embodiments of the present disclosure are described with reference to FIG. 1 through FIG. 11.

First Exemplary Embodiment

Figure 1:
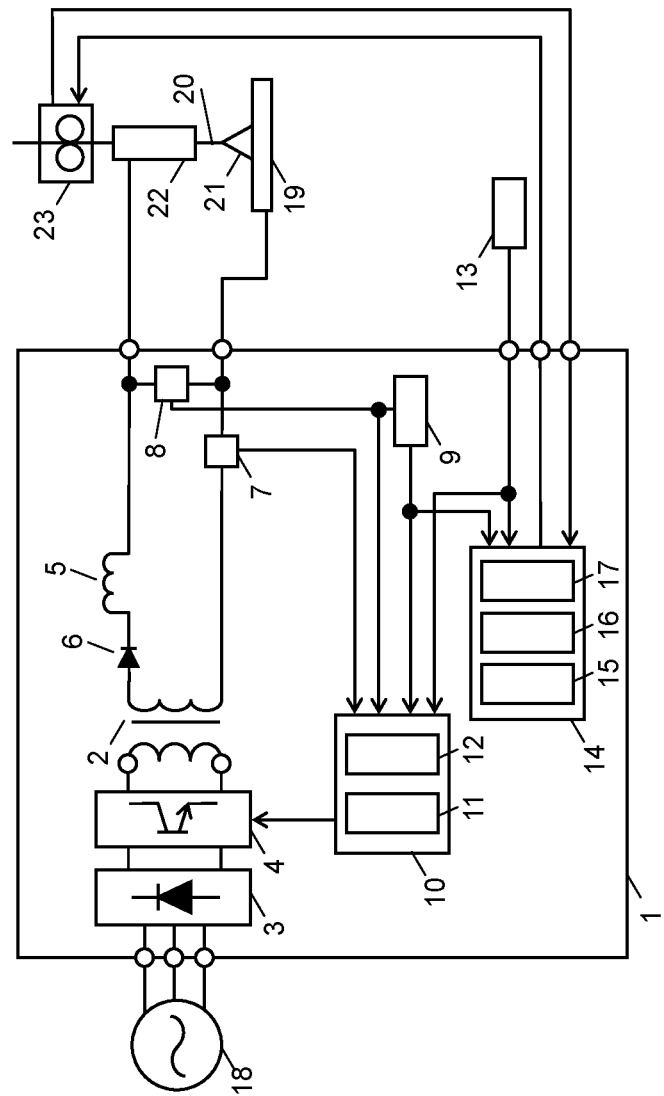
FIG. 1 is a diagram showing a schematic configuration of arc welding apparatus in accordance with a first exemplary embodiment and a second exemplary embodiment.

First, a description is provided for arc welding apparatus 1 of the first exemplary embodiment, with reference to FIG. 1. FIG. 1 is a diagram showing a schematic configuration of arc welding apparatus 1 of the first exemplary embodiment. Arc welding apparatus 1 welds object to be welded 19 by outputting welding current and welding voltage so that an arc state and a short circuit state are repeated between welding wire 20 as a consumable electrode and object to be welded 19.

As shown in FIG. 1, arc welding apparatus 1 includes main transformer 2, primary-side rectifier 3, switching part 4, reactor 5, secondary-side rectifier 6, welding current detector 7, welding voltage detector 8, short circuit/arc detector 9, output controller 10, and wire feeding speed controller 14.

Output controller 10 includes short circuit controller 11 and arc controller 12. Wire feeding speed controller 14 includes wire feeding speed detector 15, calculation unit 16, and wire feed switching controller 17.

Primary-side rectifier 3 rectifies the alternating voltage that has been input from power supply apparatus 18 disposed outside arc welding apparatus 1. Switching part 4 converts the direct voltage from primary-side rectifier 3 into the alternating voltage and controls the magnitude of the current. Main transformer 2 converts the alternating voltage from switching part 4 to the alternating voltage suitable for welding. Secondary-side rectifier 6 rectifies the alternating voltage from main transformer 2. Reactor 5 smooths the direct current from secondary-side rectifier 6 into the current suitable for welding. Welding current detector 7 detects the welding current output from arc welding apparatus 1. Welding voltage detector 8 detects the welding voltage output from arc welding apparatus 1. Based on the signal showing the welding voltage from welding voltage detector 8, short circuit/arc detector 9 determines whether the welding state between welding wire 20 and object to be welded 19 is a short circuit state or an arc state. The short circuit state is a state where welding wire 20 and object to be welded 19 are short-circuited. The arc state is a state where arc 21 occurs between welding wire 20 and object to be welded 19.

Based on the signal showing the welding current from welding current detector 7, the signal showing the welding voltage from welding voltage detector 8, and the signal showing the welding state from short circuit/arc detector 9, output controller 10 controls welding output (welding current and welding voltage) by outputting a control signal to switching part 4. Specifically, when the welding state is a short circuit state, short circuit controller 11 controls the short circuit current, which is the welding current in a short circuit period. When the welding state is an arc state, arc controller 12 controls the arc current, which is the welding current in an arc period.

Wire feeding speed controller 14 controls the feeding speed of welding wire 20 by controlling wire feeder 23. Specifically, wire feeding speed detector 15 detects the speed and direction (forward feed/reverse feed) of wire feed. The speed and direction of wire feed, in which forward feed is positive and reverse feed is negative, are generically referred to as a "wire feeding speed". Based on the signal showing the wire feeding speed from wire feeding speed detector 15, calculation unit 16 calculates predetermined periods and the cumulative amount of the feeding amounts of welding wire 20. Based on the signal showing the predetermined periods and the feeding amount of welding wire 20 from calculation unit 16, wire feed switching controller 17 performs control of delaying the switching timing from forward feed to reverse feed or from reverse feed to forward feed of welding wire 20.

Welding condition setting part 13 and wire feeder 23 are connected to arc welding apparatus 1. Welding condition setting part 13 is used when the user sets the welding conditions in arc welding apparatus 1. Based on the signal showing the wire feeding speed from wire feeding speed controller 14, wire feeder 23 controls the feed of welding wire 20.

One of the welding outputs of arc welding apparatus 1 is connected to welding wire 20 via welding chip 22. The other of the welding outputs of arc welding apparatus 1 is connected to object to be welded 19. The welding output of arc welding apparatus 1 generates arc 21 between welding wire 20 and object to be welded 19, for welding.

Figure 2:
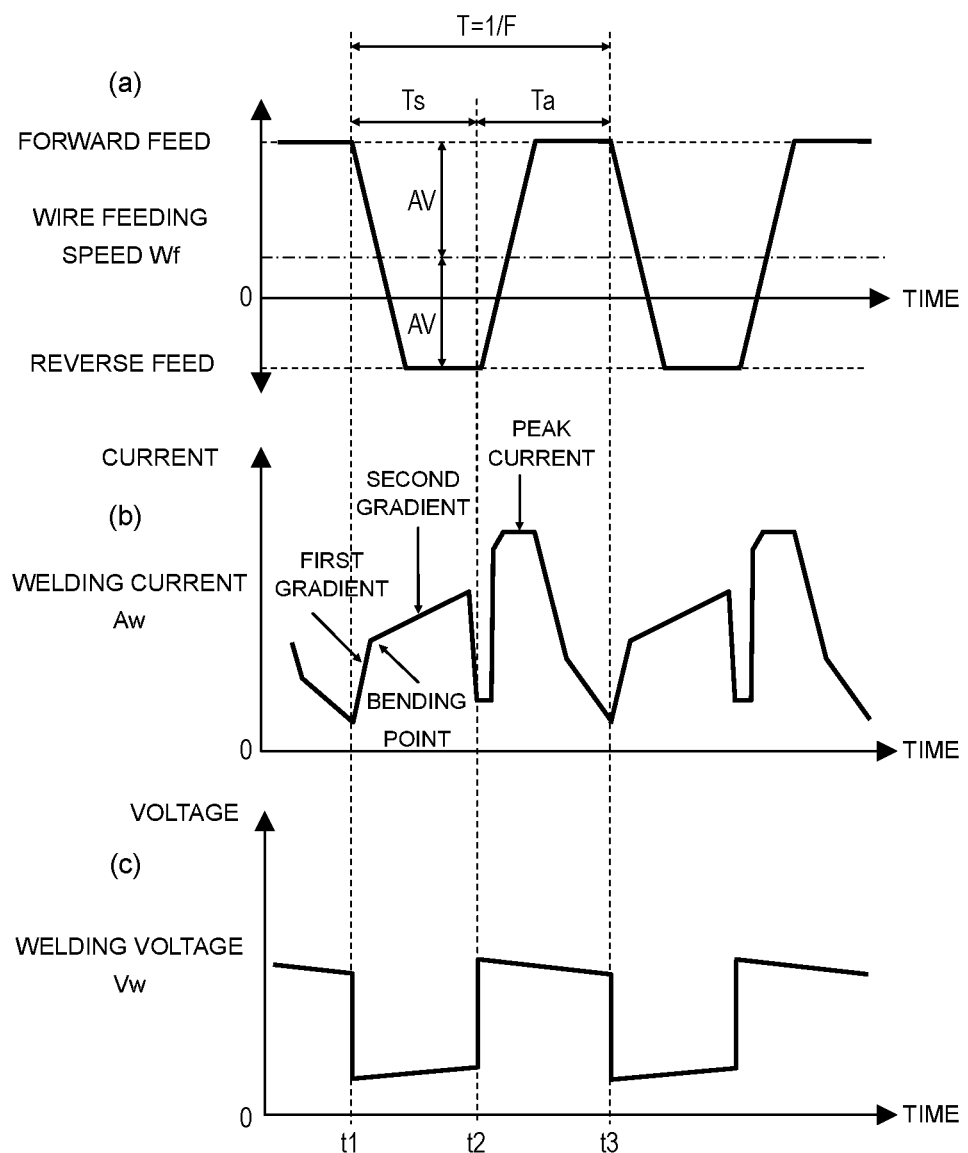
FIG. 2 is a time chart showing (a) a wire feeding speed in a trapezoidal waveform, (b) a welding current, and (c) a welding voltage in a normal arc welding method.
Figure 3:
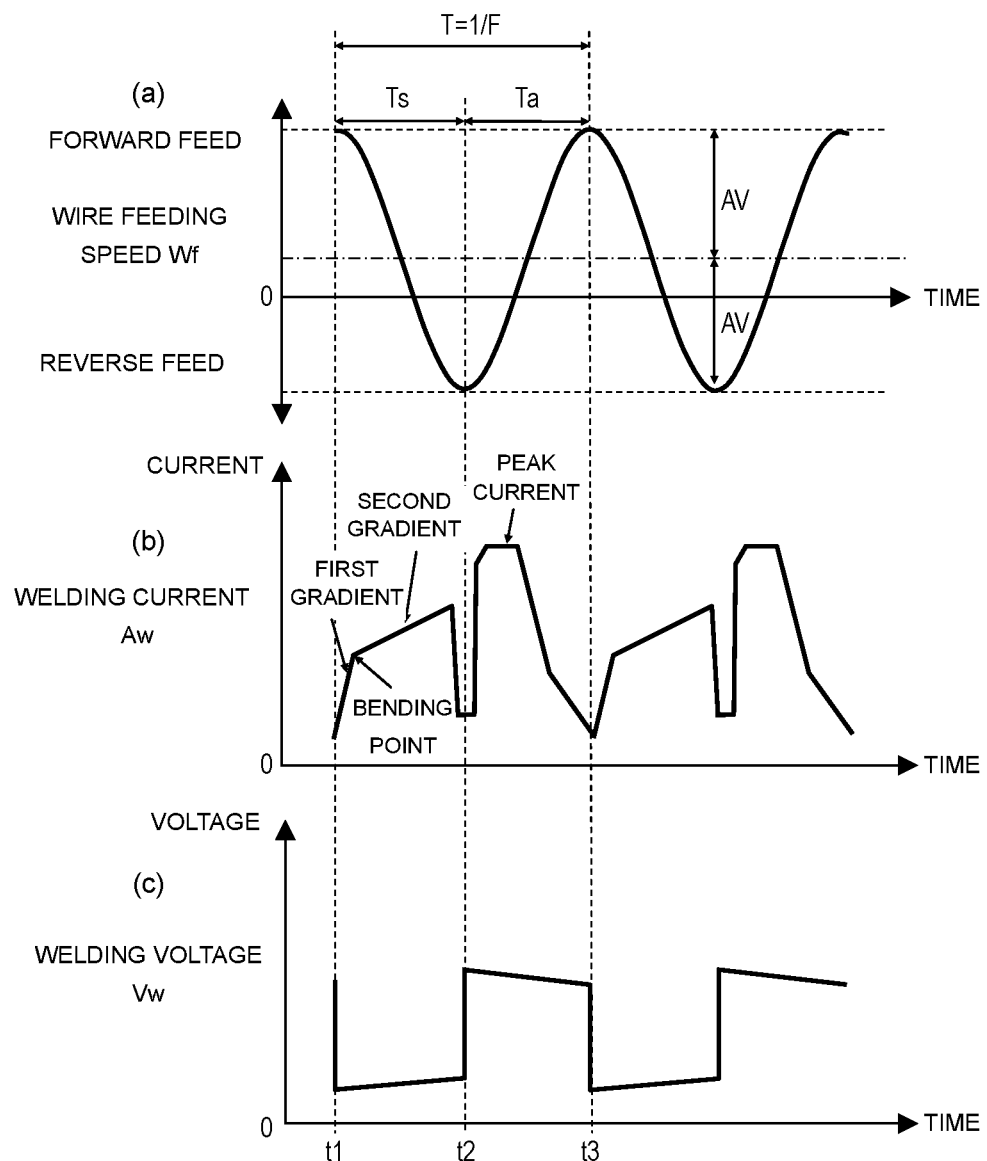
FIG. 3 is a time chart showing (a) a wire feeding speed in a sine waveform, (b) a welding current, and (c) a welding voltage in a normal arc welding method.

Next, a description is provided for the normal operation of arc welding apparatus 1 configured as above, with reference to FIG. 2 and FIG. 3. FIG. 2 and FIG. 3 are time charts for explaining a normal arc welding method when an abnormal phenomenon, such as a temporal short circuit at the beginning of the arc period or a temporal arc in the short circuit period, as described later, does no occur. In the conventional arc welding control method, the wire feeding speed is controlled (changed) in response to the welding state (short circuit state/arc state). However, in the normal operation of arc welding apparatus 1 of this exemplary embodiment, the welding state (short circuit state/arc state) is caused by controlling the wire feeding speed.

FIG. 2 is a time chart showing (a) wire feeding speed Wf in a trapezoidal waveform, (b) welding current Aw, and (c) welding voltage Vw in a normal arc welding method. Short circuit period Ts shows that the welding state is a short circuit state. Arc period Ta shows that the welding state is an arc state. The short circuit state and the arc state are alternately repeated. In the normal arc welding method shown in FIG. 2 and FIG. 3, the short circuit state is continuously maintained in short circuit period Ts and the arc state is continuously maintained in arc period Ta.

As shown in FIG. 2, wire feeding speed Wf is controlled so that the forward feed and reverse feed of the welding wire are repeated periodically in a trapezoidal waveform as a basic waveform at predetermined frequency F (Hz) at predetermined amplitude AV (meters/second). Cycle T, i.e. inverse number (1/F) of the frequency, is the sum of short circuit period Ts from time point t1 to time point t2 and arc period Ta from time point t2 to time point t3. Wire feeding speed Wf in short circuit period Ts is controlled so as to decelerate from the maximum wire feeding speed of forward feed (forward feed peak speed) toward the maximum wire feeding speed of reverse feed (reverse feed peak speed) and become constant at a reverse feed peak speed when the wire feeding speed reaches the reverse feed peak speed. Wire feeding speed Wf in arc period Ta is controlled so as to accelerate from the reverse feed peak speed toward the forward feed speed and become constant at a forward feed peak speed when the wire feeding speed reaches the forward feed peak speed. In the time charts of FIG. 4 and thereafter, the start time point of short circuit period Ts in the normal arc welding method is t1, and the start time point of arc period Ta is t2. Thus, time point t3 is shown as time point t1. In the present disclosure, short circuit period Ts starts at a timing when wire feeding speed Wf decelerates from the forward peak speed. However, the actual start of the short circuit (disappearance of arc) may be slightly before or after this timing. In the present disclosure, arc period Ta starts at a timing when wire feeding speed Wf accelerates from the reverse feed peak speed. However, the actual open of the short circuit (occurrence of arc) may be slightly before or after this timing.

In the present disclosure, the change in the wire feeding speed from the forward peak speed toward the reverse peak speed is referred to as "deceleration". The change in the wire feeding speed from the reverse peak speed toward the forward peak speed is referred to as "acceleration". That is, the definition of acceleration and deceleration includes whether the direction of the wire feeding speed is positive or negative, and acceleration and deceleration are not defined only as absolute values of the wire feeding speed.

The forward feed peak speed, the reverse feed peak speed, the period during which the forward feed peak speed is maintained (forward feed peak period), the period during which the reverse feed peak speed is maintained (reverse feed peak period), the acceleration and deceleration of the wire feeding speed, and the waveform of the wire feeding speed such as the cycle and amplitude of the wire feeding speed are preset based on the set current set by the user in the arc welding apparatus.

Welding current Aw is increased to a predetermined peak current in arc period Ta. Thereby, welding current Aw is controlled so that the melting speed of the tip of the welding wire is increased and a droplet is formed. Thus, the grown droplet moves to a molten pool and the state becomes a short circuit state, so that short circuit period Ts starts.

Welding current Aw is controlled so as to be increased with a lapse of time so that the short circuit state is opened in short circuit period Ts. For instance, as shown in FIG. 2, as a method for increasing welding current Aw, welding current Aw is increased first with a first gradient and thereafter with a second gradient gentler than the first gradient. The time point at which welding current Aw changes from the first gradient to the second gradient is called a bending point. Since the welding wire is reversely fed, the tip of the welding wire forms a constriction and thereafter is released from the object to be welded. Thus, an arc occurs between the welding wire and the object to be welded and the state becomes an arc state, so that arc period Ta starts. The reciprocating wire feed of the welding wire alternately repeats the short circuit state and the arc state, so that welding is performed. In almost all the period, the current is controlled so that such welding current Aw is achieved. After welding current Aw is controlled to the peak current in arc period Ta, voltage control for controlling welding voltage Vw is performed and welding current Aw at this time decreases to cause the short circuit state.

The waveform of wire feeding speed Wf may be a sine waveform as shown in FIG. 3. In this case, the waveform of wire feeding speed Wf is changed from a trapezoidal waveform to a sine waveform. Welding current Aw and welding voltage Vw are controlled in a manner similar to those of the control described with reference to FIG. 2.

Figure 4:
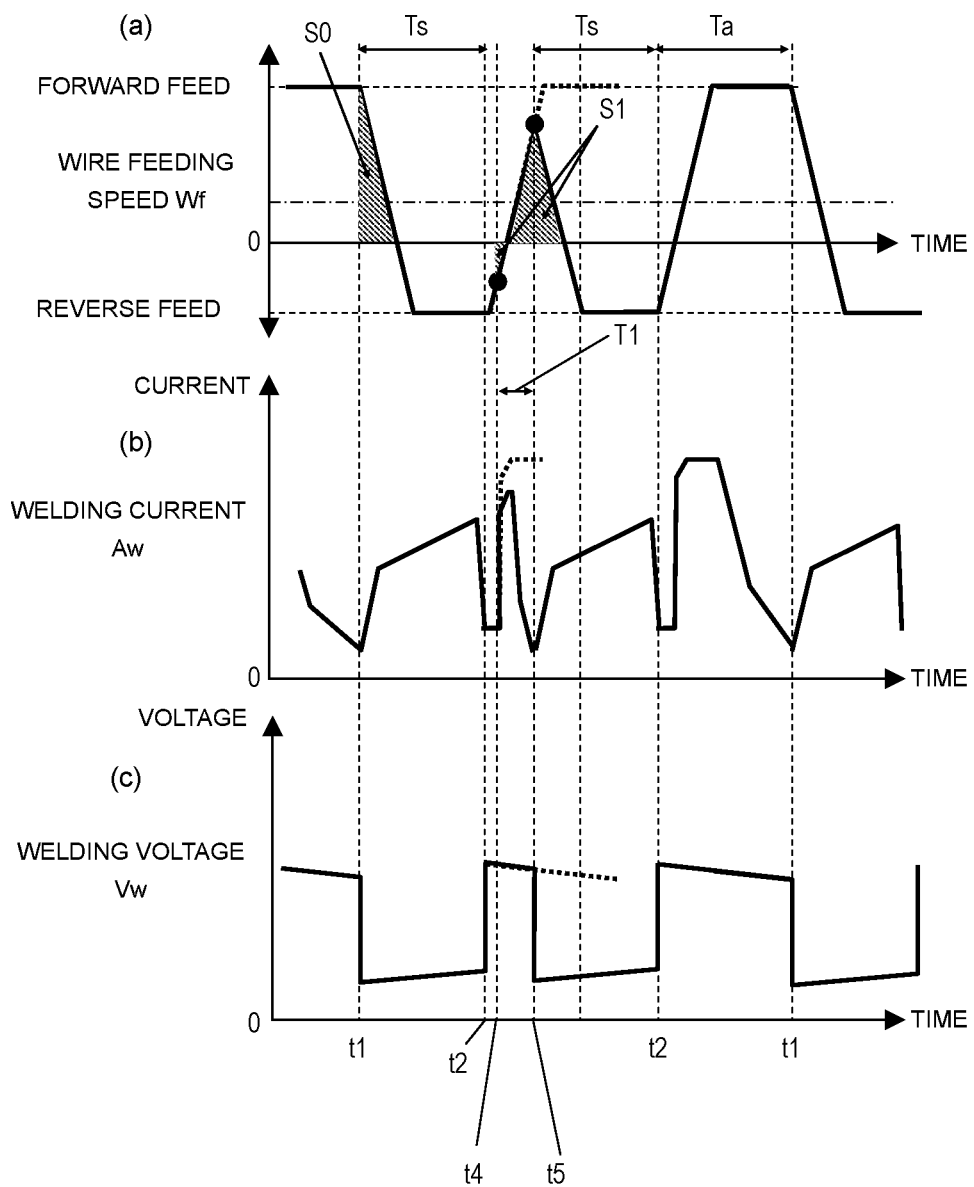
FIG. 4 is a time chart showing (a) a wire feeding speed in a trapezoidal waveform, (b) a welding current, and (c) a welding voltage in an arc welding method in accordance with the first exemplary embodiment.

Next, with reference to FIG. 4, a description is provided for an arc welding method when a micro short circuit, i.e. a temporal abnormal phenomenon, occurs in arc period Ta. Normally, an arc state is continuously maintained in arc period Ta. However, when the distance between welding wire 20 and object to be welded 19 becomes shorter than the ideal distance, a micro short circuit, i.e. a temporal short circuit, is likely to occur. A micro short circuit occurs when a molten pool (not shown) formed in object to be welded 19 vibrates vertically and the molten pool makes contact with the droplet formed at the tip of welding wire 20. The short circuit is immediately opened and an arc occurs again. At this time, spatters, i.e. a scatter of molten metal, occur.

As shown in FIG. 4, until time point t2, normal arc welding is performed. As for wire feeding speed Wf at this time, the forward feed peak speed ranges 10 to 24 m/second, the reverse feed peak speed ranges from −4 to −6 m/second, and the average speed of wire feeding speed Wf ranges 2 to 10 m/second. That is, as a whole, forward feed for supplying the wire to the welding point is performed. Further, as for wire feeding speed Wf, frequency F is 100 Hz (cycle T is 10 milliseconds), the forward feed peak period ranges from 2 to 3 milliseconds, and the reverse feed peak period ranges from 2 to 3 milliseconds. Further, the peak current of welding current Aw is 300 A, for example. Further, the upper limit of welding voltage Vw is 40V and the lower limit thereof is 10V, for example. This feed of the welding wire is referred to as "reciprocating wire feed".

Next, a description is provided for the control in the case where a micro short circuit occurs while the welding wire is accelerated at time point t4 (a second time point) after time point t2 (a first time point). When a short circuit is detected in arc period Ta, it is necessary to determine whether the short circuit generated is a normal short circuit or an abnormal short circuit. For this purpose, a first determination period is set. In this exemplary embodiment, the first determination period is for two milliseconds and time point t4 is one millisecond after time point t2, for example. The first determination period is set to approximately 20% to 50% of arc period Ta or approximately 10% to 25% of cycle T of wire feeding speed Wf. Then, the short circuit generated after the start of arc period Ta and before the lapse of the first determination period is determined as a temporal abnormal phenomenon, and an abnormal arc welding step is performed. The short circuit generated after the lapse of the first determination period after the start of arc period Ta is determined as a normal phenomenon. Then, no abnormal arc welding step is performed and reciprocating wire feed is continued.

The abnormal arc welding step is further detailed. When the short circuit generated at time point t4 (the second time point) in arc period Ta is determined to be a temporal abnormal phenomenon, time point t5 (the third time point) first period T1 after time point t4 is set. First period T1 ranges from 250 microseconds to 1 millisecond, for example. Welding wire 20 continues reciprocating wire feed until time point t5 and wire feeding speed Wf is changed to deceleration at time point t5. After time point t5, normal reciprocating wire feed is restarted. In FIG. 4, wire feeding speed Wf, welding current Aw, and welding voltage Vw in the abnormal arc welding step are shown by solid lines. Wire feeding speed Wf, welding current Aw, and welding voltage Vw when an abnormal arc welding step is not performed are shown by the dotted lines. First period T1 is set to a length that is derived from experiments and equal to or longer than the period in which the next short circuit occurs certainly.

As the method for setting first period T1, i.e. time point t5, this value may be set based on the feeding amount of the welding wire. In FIG. 4, the timing at which wire feeding speed Wf is switched from acceleration to deceleration may be set based on the feeding amount of welding wire 20 after detection of a micro short circuit.

Specifically, in normal reciprocating wire feed, the feeding amount of welding wire 20 in decelerating forward feed is set to reference feeding amount S0. As shown in FIG. 4, reference feeding amount S0 corresponds to the area in the time chart where wire feeding speed Wf first becomes zero after time point t1. This can be obtained automatically when wire feeding speed Wf is set. Since wire feeding speed Wf is set based on the current set by the user as described above, reference feeding amount S0 can be obtained at the same time.

Then, first period T1 is set so that the feeding amount S1 of welding wire 20 when wire feeding speed Wf first becomes zero after time point t4 through time point t5 is equal to reference feeding amount S0. As shown in FIG. 4, feeding amount S1 corresponds to the area in the time chart at the time point when wire feeding speed Wf first becomes zero after time point t4 through time point t5. The acceleration and deceleration of wire feeding speed Wf are determined by wire feeding speed Wf. Thus, at time point t4, future acceleration and deceleration can be used to predict feeding amount S1 of welding wire 20. Feeding amount S1 of welding wire 20 is negative while wire feeding speed Wf is in the reverse direction, and is positive while the wire feeding speed is in the forward direction.

In this manner, even when a temporal abnormality is detected, in first period T1, reciprocating wire feed is continued. This operation allows stable arc welding without a sudden change in the feed of the welding wire 20. Further, the feed of welding wire 20 is changed to deceleration at a time point when first period T1 has elapsed. This operation can improve the state where the distance between welding wire 20 and object to be welded 19 is too small, which caused the micro short circuit, and thereby prevents occurrence of micro short circuits thereafter.

The value of first period T1 is preset for each set current set in arc welding apparatus 1. Based on the set current, first period T1 is determined by calculation unit 16 in wire feeding speed controller 14. First period T1 determined by calculation unit 16 is transmitted to wire feed switching controller 17. Based on first period T1, wire feed switching controller 17 controls switching timing of wire feeding speed Wf from acceleration to deceleration.

As shown in FIG. 4, in addition to wire feeding speed Wf, welding current Aw may be controlled. As shown in FIG. 4, it is preferable that the peak current of welding current Aw is reduced from 300 A to 250 A, for example, when a micro short circuit is detected at time point t4. In the abnormal arc welding step, reducing the peak current of welding current Aw can reduce the occurrence of additional micro short circuits in the abnormal arc welding step.

Variation of First Exemplary Embodiment

Figure 5:
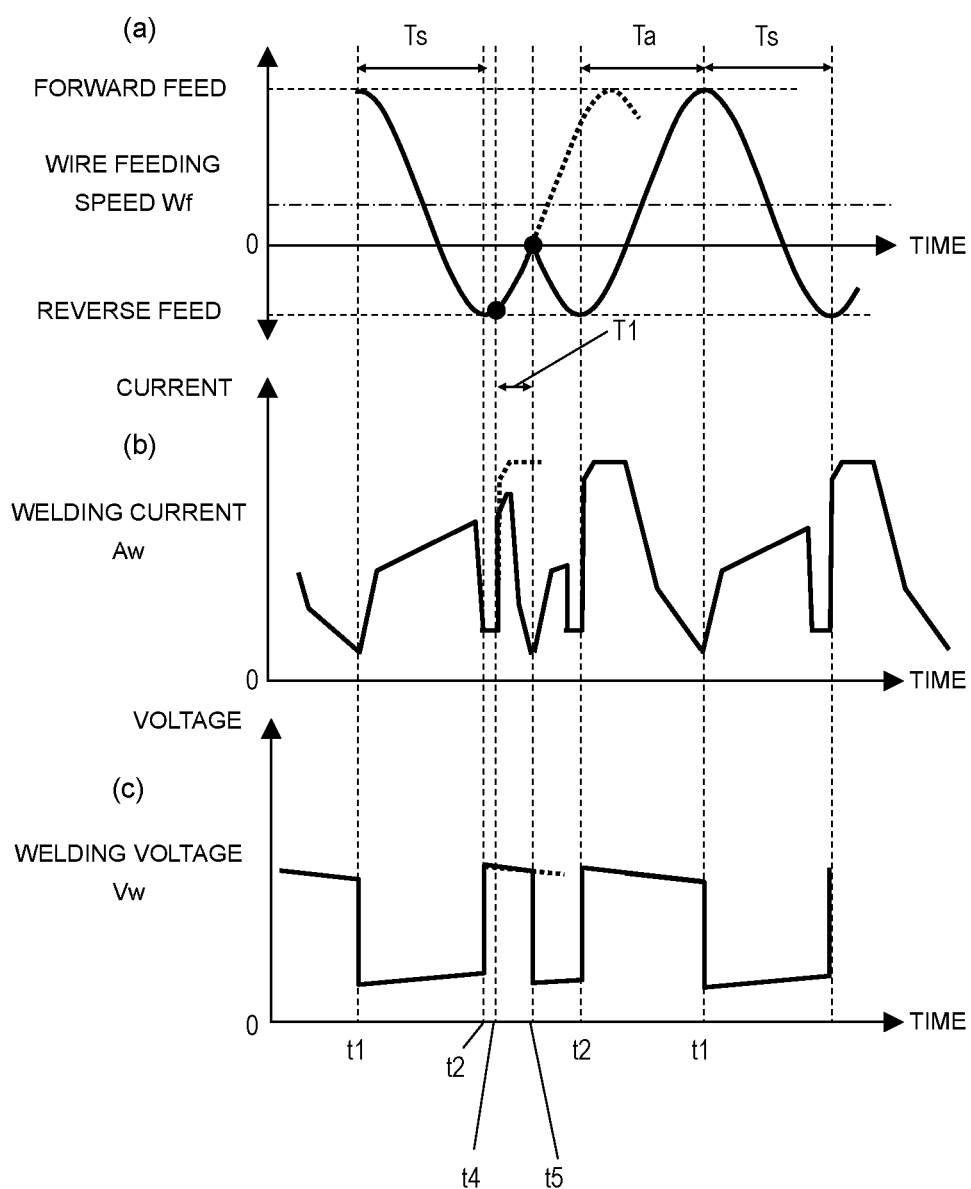
FIG. 5 is a time chart showing (a) a wire feeding speed in a sine waveform, (b) a welding current, and (c) a welding voltage in an arc welding method in accordance with a variation of the first exemplary embodiment.

Next, with reference to FIG. 5, a description is provided for the variation of the first exemplary embodiment. Elements similar to those of the first exemplary embodiment have the same reference marks and the descriptions of those elements are omitted.

This variation differs from the first exemplary embodiment in a waveform of wire feeding speed Wf. As shown in FIG. 4, wire feeding speed Wf in the first exemplary embodiment is a trapezoidal waveform. However, as shown in FIG. 5, wire feeding speed Wf in this variation is in a sine waveform.

As for wire feeding speed Wf of this variation, the forward feed peak speed, the reverse feed peak speed, the average speed of wire feeding speed Wf, and frequency F are similar to those shown in the first exemplary embodiment. However, neither the forward feed peak period nor the reverse feed peak period is present. The peak current of welding current Aw, and the upper limit and lower limit of welding voltage Vw are similar to those shown in the first exemplary embodiment. In this variation where wire feeding speed Wf is in a sine waveform, the feed of the welding wire is "reciprocating wire feed".

The switching of wire feeding speed Wf at time point t5 is similar to that shown in the first exemplary embodiment. Further, in this variation, the peak current of welding current Aw may be reduced.

Second Exemplary Embodiment

Figure 6:
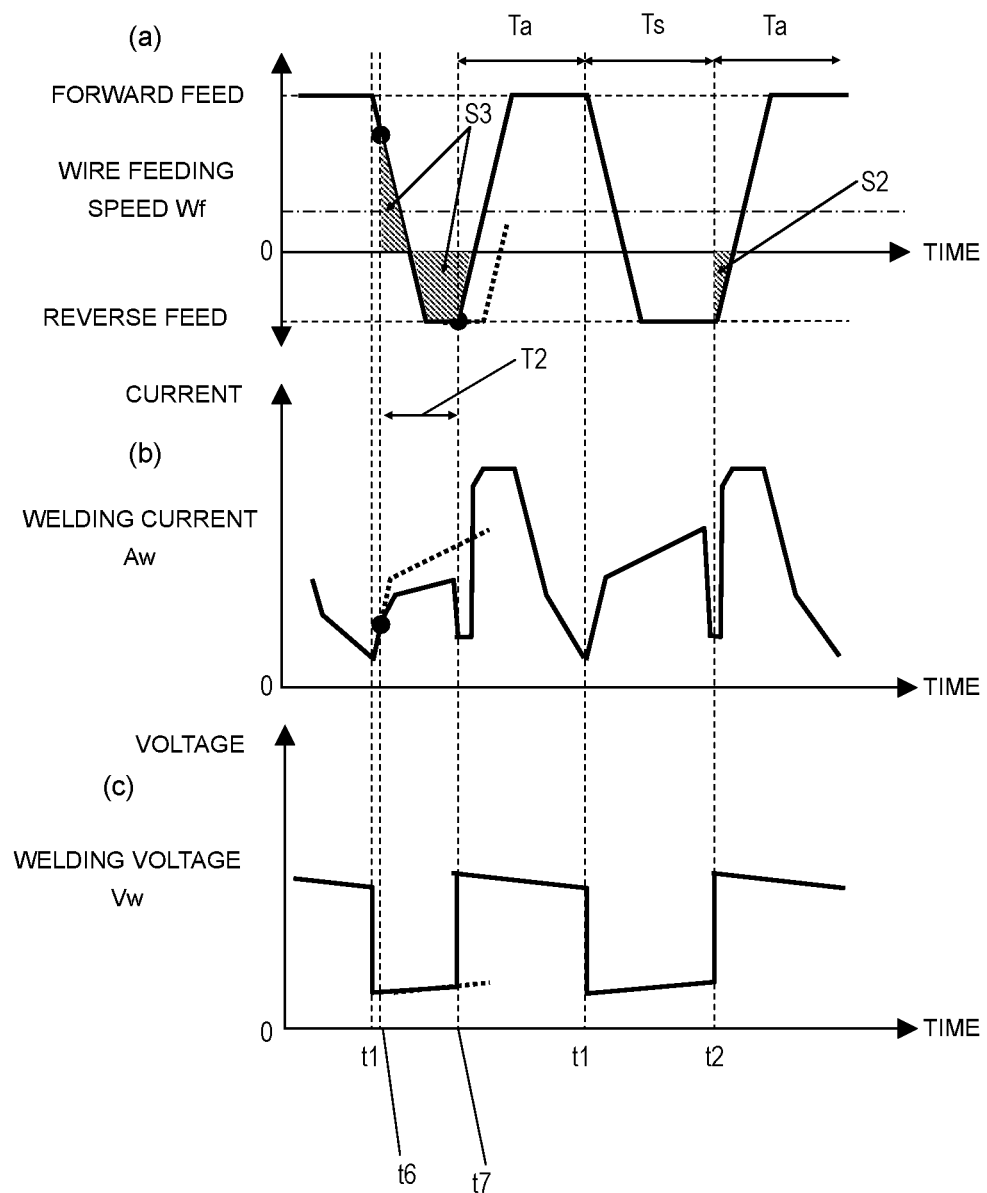
FIG. 6 is a time chart showing (a) a wire feeding speed in a trapezoidal waveform, (b) a welding current, and (c) a welding voltage in an arc welding method in accordance with the second exemplary embodiment.

Next, with reference to FIG. 6, a description is provided for an arc welding method when an arc occurs as a temporary abnormal phenomenon in short circuit period Ts. Elements similar to those of the first exemplary embodiment have the same reference marks and the descriptions of those elements are omitted.

Normally, in short circuit period Ts, a short circuit state is continuously maintained. However, when the distance between welding wire 20 and object to be welded 19 becomes longer than the ideal distance, an arc is likely to occur when a short circuit is suddenly opened (hereinafter, being referred to as a sudden arc). The sudden arc occurs when welding wire 20 and object to be welded 19 become away from each other. The short circuit of the wire immediately starts again. The sudden arc causes spatters, i.e. a scatter of molten metal.

As shown in FIG. 6, until time point t6, normal short circuit welding is performed. As for wire feeding speed Wf at this time, the forward feed peak speed, the reverse feed peak speed, and the average speed of wire feeding speed Wf, the forward feed peak period, the reverse feed peak period, and frequency F are similar to those shown in the first exemplary embodiment. Further, the peak current of welding current Aw, and the upper limit and the lower limit of welding voltage Vw are similar to those shown in the first exemplary embodiment.

Next, a description is provided for the control in the case where a sudden arc occurs while the welding wire is decelerated at time point t6 (a fifth time point) after time point t1 (a fourth time point). When an arc is detected in short circuit period Ts, it is necessary to determine whether the arc generated is a normal short circuit or an abnormal short circuit. For this purpose, a second determination period is set. In this exemplary embodiment, the second determination period is for two milliseconds and time point t6 is one millisecond after time point t1, for example. The second determination period is set to approximately 20% to 50% of short circuit period Ts or approximately 10% to 25% of cycle T of wire feeding speed Wf. Then, the arc generated after the start of short circuit period Ts and before a lapse of the second determination period is determined as a temporal abnormal phenomenon, and an abnormal short circuit welding step is performed. The arc generated after the lapse of the second determination period after the start of short circuit period Ts is determined as a normal phenomenon. Then, no abnormal short circuit welding step is performed and reciprocating wire feed is continued.

The abnormal arc welding step is further detailed. When the arc generated at time point t6 (the fifth time point) in short circuit period Ts is determined to be a temporal abnormal phenomenon, time point t7 (the sixth time point) second period T2 after time point t6 is set. Second period T2 ranges from 250 microseconds to 1 millisecond, for example. Welding wire 20 continues reciprocating wire feed until time point t7 and wire feeding speed Wf is changed to acceleration at time point t7. After time point t7, normal reciprocating wire feed is restarted. In FIG. 6, wire feeding speed Wf, welding current Aw, and welding voltage Vw in the abnormal short circuit welding step are shown by solid lines. Wire feeding speed Wf, welding current Aw, and welding voltage Vw when the abnormal short circuit welding step is not performed are shown by the dotted lines. Second period T2 is set to the length that is derived from experiments and equal to or longer than the period in which the next arc occurs certainly.

As the method for setting second period T2, i.e. time point t7, this value may be set based on the feeding amount of the welding wire. In FIG. 6, the timing at which wire feeding speed Wf is switched from deceleration to acceleration may be set based on the feeding amount of welding wire 20 after detection of a sudden arc.

Specifically, in normal reciprocating wire feed, the feeding amount of welding wire 20 in accelerating reverse feed is set to reference feeding amount S2. As shown in FIG. 6, reference feeding amount S2 corresponds to the area in the time chart where wire feeding speed Wf first becomes zero after time point t2. This can be obtained automatically when wire feeding speed Wf is set. Since wire feeding speed Wf is set based on the current set by the user as described above, reference feeding amount S2 can be obtained at the same time.

Then, second period T2 is set so that the feeding amount S3 of welding wire 20 when wire feeding speed Wf first becomes zero after time point t6 through time point t7 is equal to reference feeding amount S2. As shown in FIG. 6, feeding amount S3 corresponds to the area in the time chart at the time point when wire feeding speed Wf first becomes zero after time point t6 through time point t7. The acceleration and deceleration of wire feeding speed Wf are determined by wire feeding speed Wf. Thus, at time point t6, future acceleration and deceleration can be used to predict feeding amount S3 of welding wire 20. Feeding amount S3 of welding wire 20 is negative while wire feeding speed Wf is in the reverse direction, and is positive while the wire feeding speed is in the forward direction.

In this manner, even when a temporal abnormality is detected, in second period T2, reciprocating wire feed is continued. This operation allows stable arc welding without a sudden change in the feed of welding wire 20. Further, the feed of welding wire 20 is changed to acceleration at a time point when second period T2 has elapsed. This operation can improve the state where the distance between welding wire 20 and object to be welded 19 is too large, which caused a sudden arc, and thereby prevents occurrence of sudden arcs thereafter.

The value of second period T2 is preset for each set current set in arc welding apparatus 1. Based on the set current, second period T2 is determined by calculation unit 16 in wire feeding speed controller 14. Second period T2 determined by calculation unit 16 is transmitted to wire feed switching controller 17. Based on second period T2, wire feed switching controller 17 controls switching timing of wire feeding speed Wf from deceleration to acceleration.

As shown in FIG. 6, in addition to wire feeding speed Wf, welding current Aw may be controlled. As shown in FIG. 6, it is preferable that the gradient of welding current Aw is made gentle when a micro short circuit is detected at time point t6. In the abnormal short circuit welding step, reducing the gradient of welding current Aw can reduce the occurrence of additional sudden arcs in the abnormal short circuit welding step.

Variation of Second Exemplary Embodiment

Figure 7:
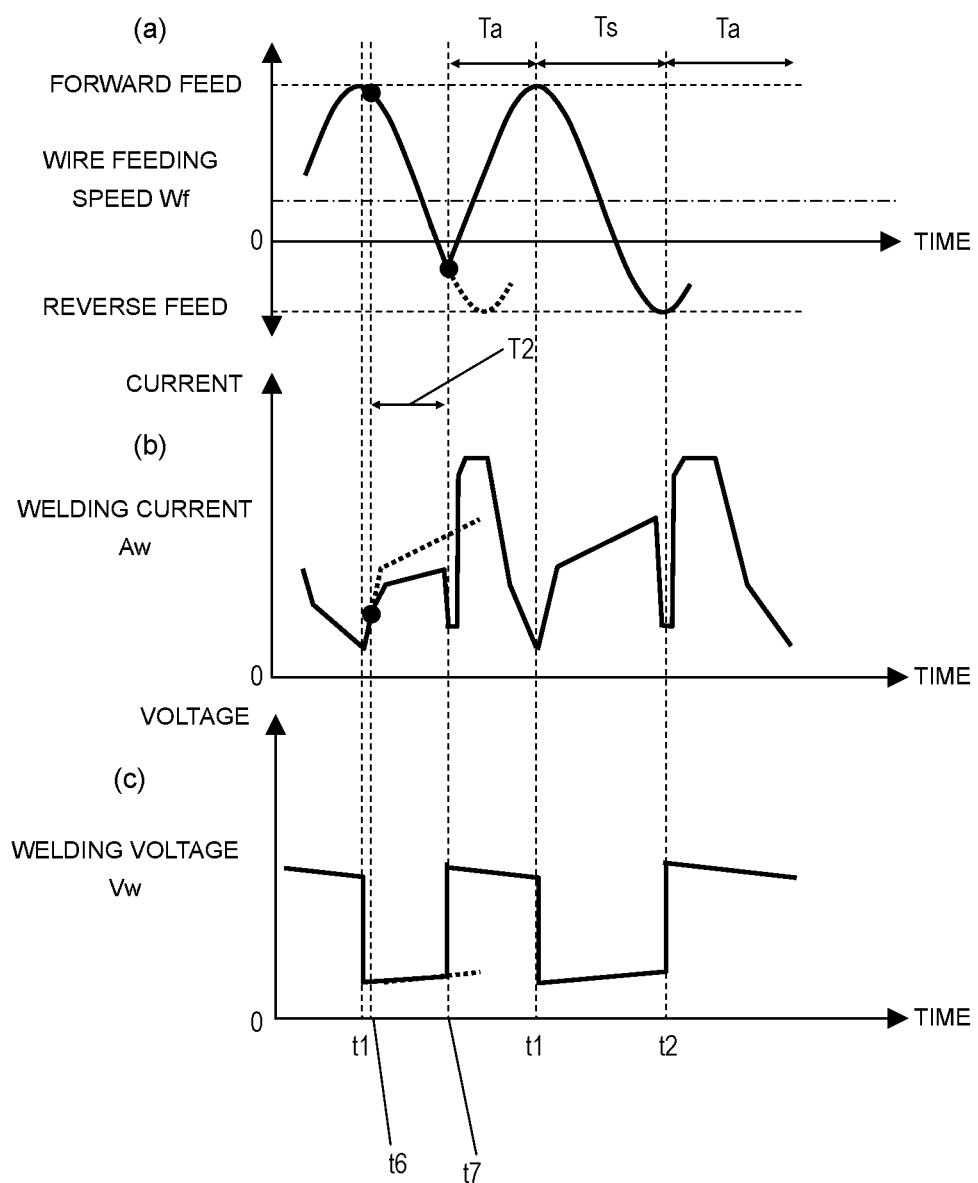
FIG. 7 is a time chart showing (a) a wire feeding speed in a sine waveform, (b) a welding current, and (c) a welding voltage in an arc welding method in accordance with a variation of the second exemplary embodiment.

Next, with reference to FIG. 7, a description is provided for the variation of the second exemplary embodiment. Elements similar to those of the second exemplary embodiment have the same reference marks and the descriptions of those elements are omitted.

This variation differs from the second exemplary embodiment in a waveform of wire feeding speed Wf. As shown in FIG. 6, wire feeding speed Wf in the second exemplary embodiment is in a trapezoidal waveform. However, as shown in FIG. 7, wire feeding speed Wf in this variation is in a sine waveform.

As for wire feeding speed Wf of this variation, the forward feed peak speed, the reverse feed peak speed, the average speed of wire feeding speed Wf, and frequency F are similar to those shown in the second exemplary embodiment (i.e. the first exemplary embodiment). However, neither the forward feed peak period nor the reverse feed peak period is present. The peak current of welding current Aw, and the upper limit and lower limit of welding voltage Vw are similar to those shown in the second exemplary embodiment (i.e. the first exemplary embodiment). Also when the wire feeding speed is set as a sine waveform, the feed of the welding wire is "reciprocating wire feed".

The switching of wire feeding speed Wf at time point t7 is similar to that shown in the second exemplary embodiment. Further, in this variation, the gradient of welding current Aw may be made gentle.

Third Exemplary Embodiment

Figure 8:
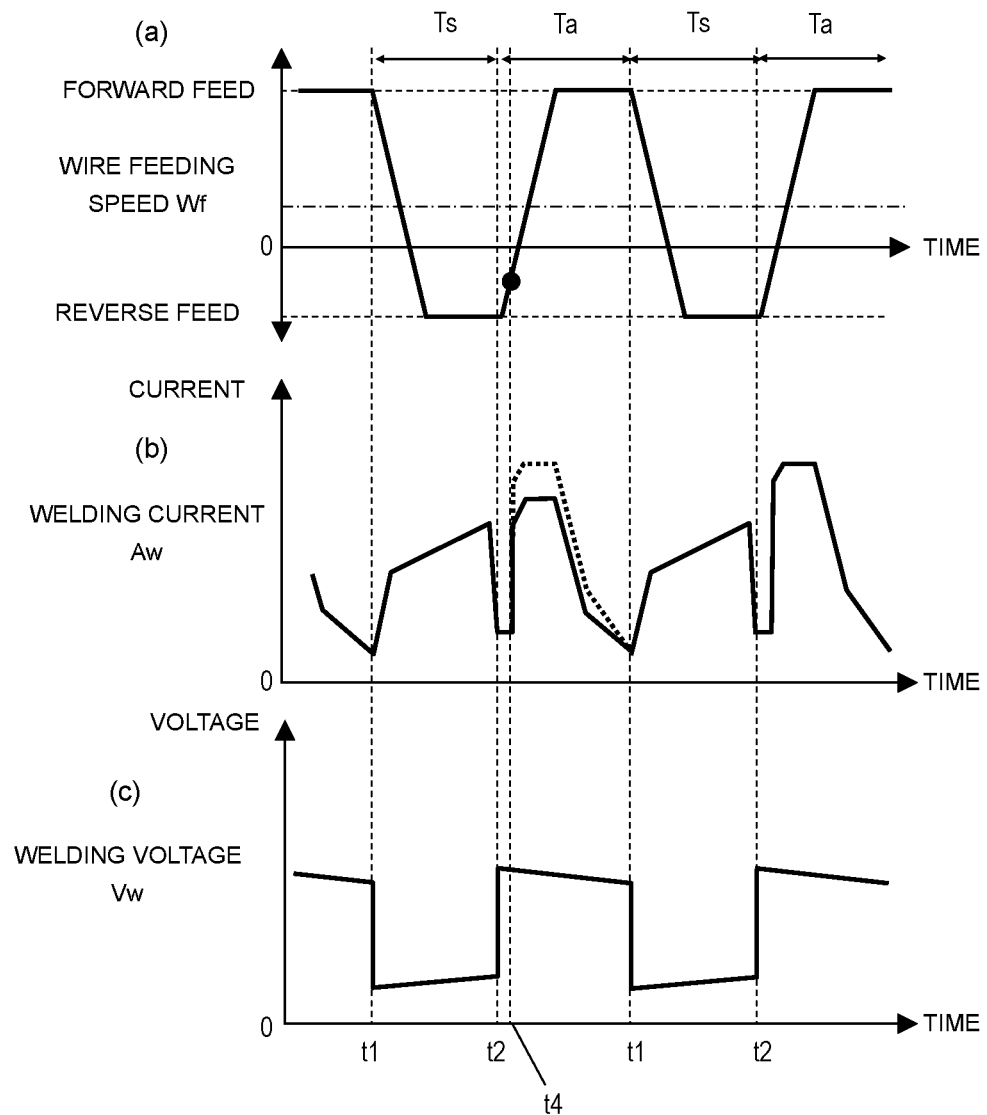
FIG. 8 is a time chart showing (a) a wire feeding speed in a trapezoidal waveform, (b) a welding current, and (c) a welding voltage in an arc welding method in accordance with a third exemplary embodiment.

Next, with reference to FIG. 8, a description is provided for an arc welding method in the case where a micro short circuit, i.e. a temporary abnormal phenomenon, occurs in arc period Ta. Elements similar to those of the first exemplary embodiment have the same reference marks and the descriptions of those elements are omitted.

This exemplary embodiment differs from the first exemplary embodiment in that, as for wire feeding speed Wf, the normal reciprocating wire feed is continued even when a micro short circuit is detected. Further, this exemplary embodiment differs from the first exemplary embodiment in that the peak current of welding current Aw is always reduced, which is optional in the first exemplary embodiment.

When a short circuit is detected at time point t4, the peak current of welding current Aw is reduced. This operation can reduce the occurrence of an additional short circuit in arc period Ta in which the short circuit has occurred. Thus, normal reciprocating wire feed of the welding wire can reduce the occurrence of an additional micro short circuit before the next short circuit state is caused. When the next short circuit state is caused, the state of excessively small distance between welding wire 20 and object to be welded 19, which caused the micro short circuit, is improved to a certain degree. Thus, the advantageous effect of the object of the present disclosure can be achieved.

Variation of Third Exemplary Embodiment

Figure 9:
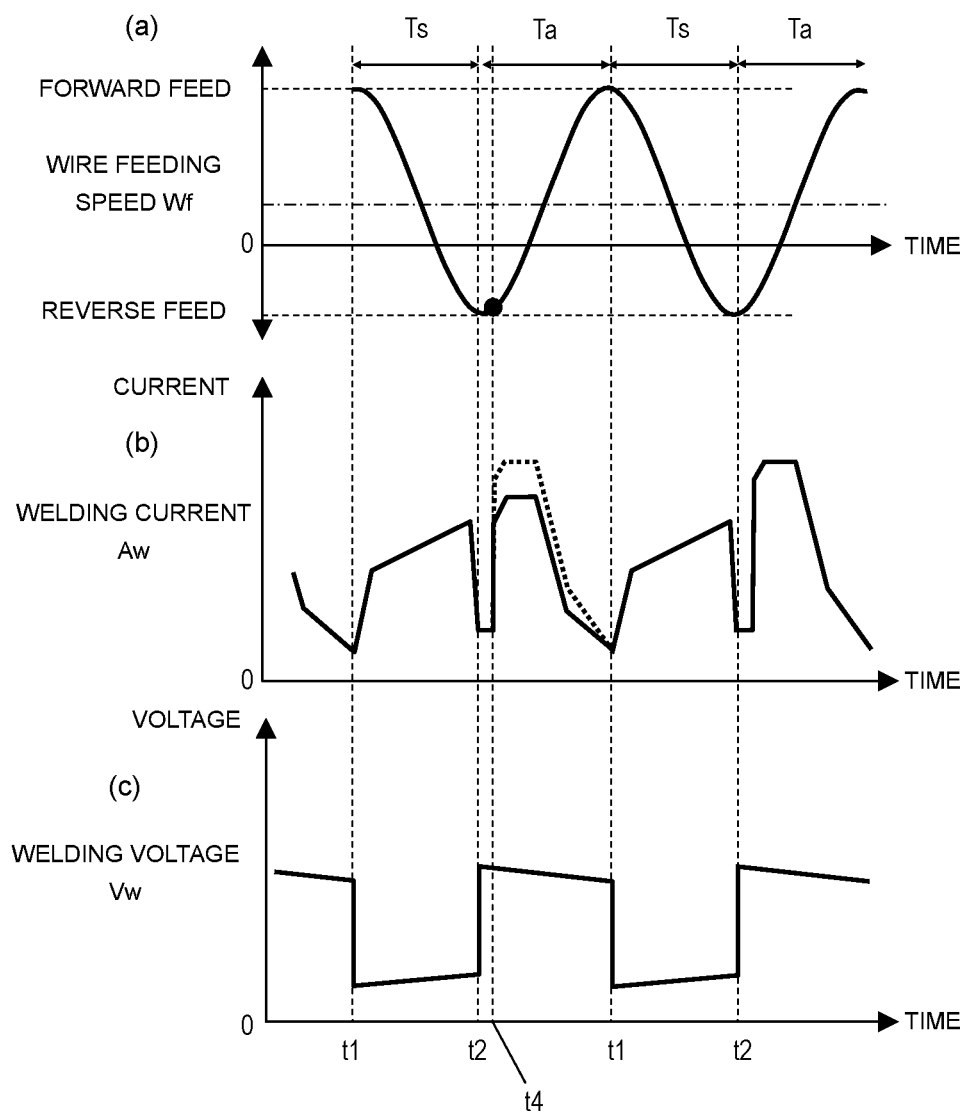
FIG. 9 is a time chart showing (a) a wire feeding speed in a sine waveform, (b) a welding current, and (c) a welding voltage in an arc welding method in accordance with a variation of the third exemplary embodiment.

Next, with reference to FIG. 9, a description is provided for the variation of the third exemplary embodiment. Elements similar to those of the third exemplary embodiment have the same reference marks and the descriptions of those elements are omitted.

This variation differs from the third exemplary embodiment in a waveform of wire feeding speed Wf. As shown in FIG. 8, wire feeding speed Wf in the third exemplary embodiment is in a trapezoidal waveform. However, as shown in FIG. 9, wire feeding speed Wf in this variation is in a sine waveform.

As for wire feeding speed Wf of this variation, the forward feed peak speed, the reverse feed peak speed, the average speed of wire feeding speed Wf, and frequency F are similar to those shown in the first exemplary embodiment. However, neither the forward feed peak period nor the reverse feed peak period is present. The peak current of welding current Aw, and the upper limit and lower limit of welding voltage Vw are similar to those shown in the first exemplary embodiment. Also in this variation where wire feeding speed Wf is in a sine waveform, the feed of the welding wire is "reciprocating wire feed".

When a micro short circuit is detected at time point t4, the peak current of welding current Aw is reduced. Thereby, occurrence of an additional short circuit can be reduced in arc period Ta in which the short circuit has occurred. Thus, normal reciprocating wire feed of the welding wire can reduce the occurrence of an additional micro short circuit before the next short circuit state is caused. When the next short circuit is caused, the state of excessively small distance between welding wire 20 and object to be welded 19, which caused the micro short circuit, is improved to a certain degree. Thus, the advantageous effect of the object of the present disclosure can be achieved.

Fourth Exemplary Embodiment

Figure 10:
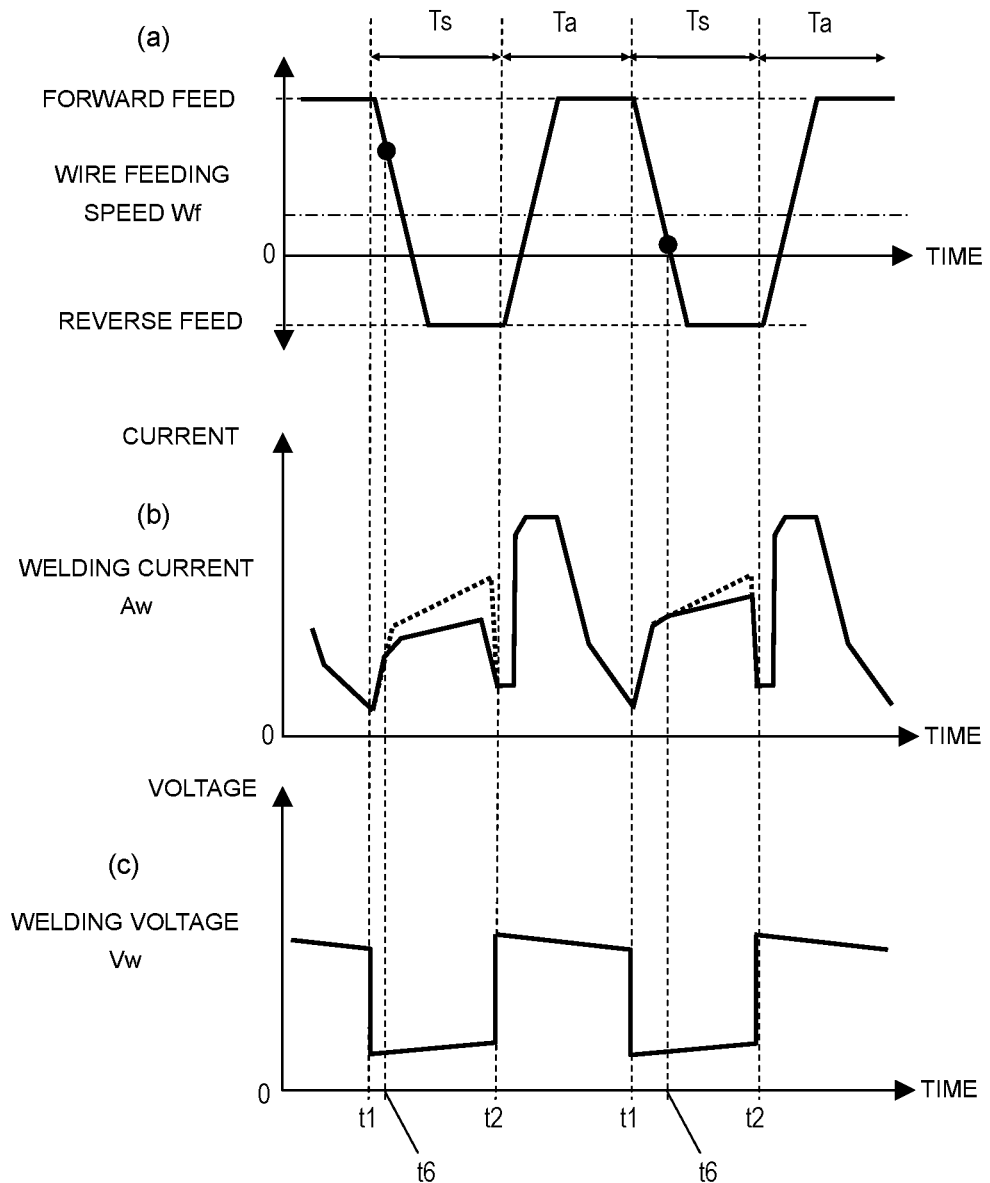
FIG. 10 is a time chart showing (a) a wire feeding speed in a trapezoidal waveform, (b) a welding current, and (c) a welding voltage in an arc welding method in accordance with a fourth exemplary embodiment.

Next, with reference to FIG. 10, a description is provided for an arc welding method in the case where an arc occurs as a temporary abnormal phenomenon in short circuit period Ts. Elements similar to those of the second exemplary embodiment have the same reference marks and the descriptions of those elements are omitted.

This exemplary embodiment differs from the second exemplary embodiment in that, as for wire feeding speed Wf, the normal reciprocating wire feed is continued even when a micro short circuit is detected. Further, this exemplary embodiment differs from the second exemplary embodiment in that the gradient of welding current Aw is always made gentle, which is optional in the second exemplary embodiment.

When a sudden arc is detected at time point t6, the gradient of welding current Aw is made gentle. This operation can reduce the occurrence of an additional sudden arc in short circuit period Ts in which the sudden arc has occurred. Thus, normal reciprocating wire feed of the welding wire can reduce the occurrence of an additional sudden arc before the next arc state is caused. When the next arc state is caused, the state of excessively large distance between welding wire 20 and object to be welded 19, which caused the sudden arc, is improved to a certain degree. Thus, the advantageous effect of the object of the present disclosure can be achieved.

Variation of Fourth Exemplary Embodiment

Figure 11:
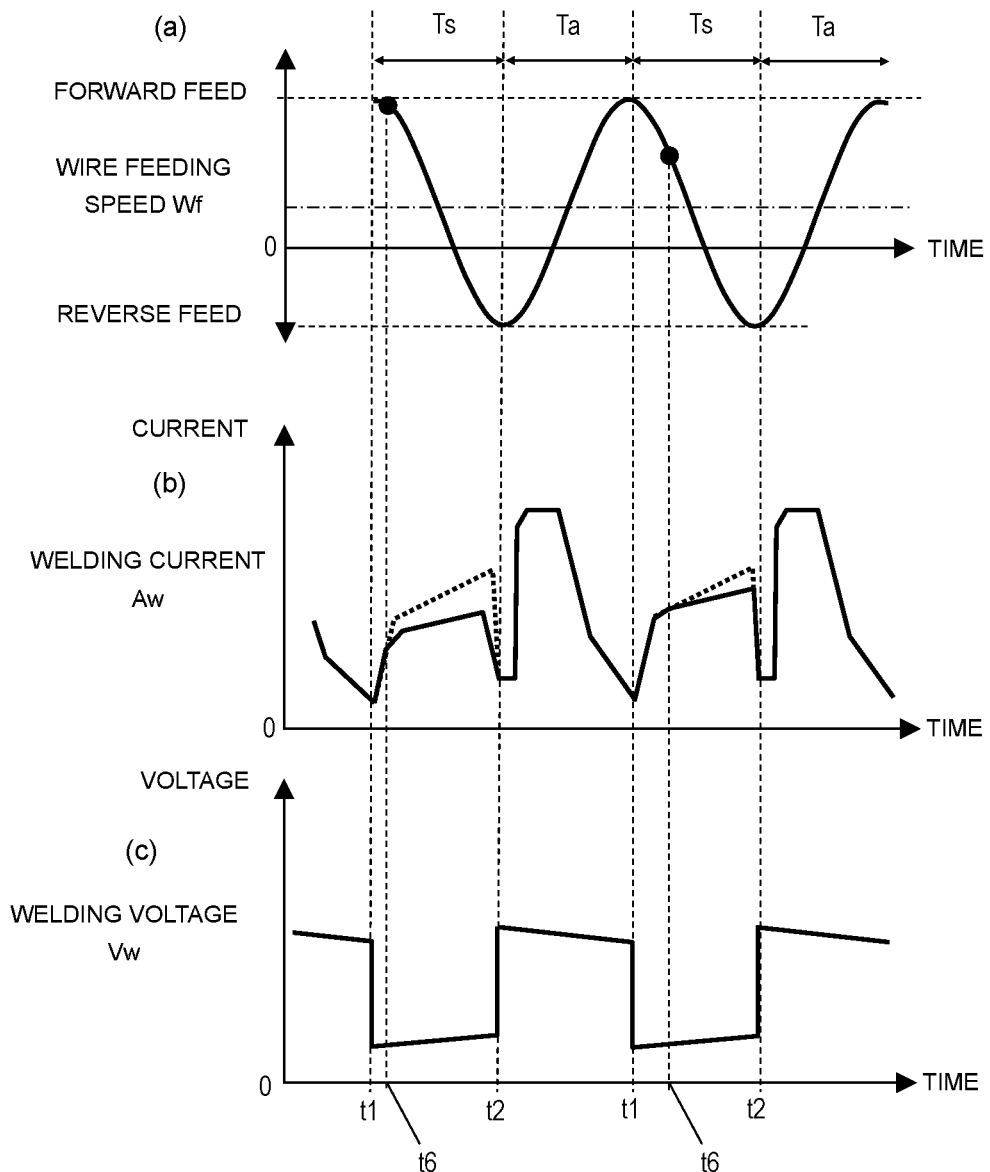
FIG. 11 is a time chart showing (a) a wire feeding speed in a sine waveform, (b) a welding current, and (c) a welding voltage in an arc welding method in accordance with a variation of the fourth exemplary embodiment.

Next, with reference to FIG. 11, a description is provided for the variation of the fourth exemplary embodiment. Elements similar to those of the fourth exemplary embodiment have the same reference marks and the descriptions of those elements are omitted.

This variation differs from the fourth exemplary embodiment in a waveform of wire feeding speed Wf. As shown in FIG. 10, wire feeding speed Wf in the fourth exemplary embodiment is in a trapezoidal waveform. However, as shown in FIG. 11, wire feeding speed Wf in this variation is in a sine waveform.

As for wire feeding speed Wf of this variation, the forward feed peak speed, the reverse feed peak speed, the average speed of wire feeding speed Wf, and frequency F are similar to those shown in the fourth exemplary embodiment. However, neither the forward feed peak period nor the reverse feed peak period is present. The peak current of welding current Aw, and the upper limit and lower limit of welding voltage Vw are similar to those shown in the fourth exemplary embodiment. Also in this variation where wire feeding speed Wf is in a sine waveform, the feed of the welding wire is "reciprocating wire feed".

When a sudden arc is detected at time point t6, the gradient of welding current Aw is made gentle. This operation can reduce the occurrence of an additional sudden arc in short circuit period Ts in which the sudden arc has occurred. Thus, normal reciprocating wire feed of the welding wire can reduce the occurrence of an additional sudden arc before the next short circuit state is caused. When the next arc state is caused, the state of excessively large distance between welding wire 20 and object to be welded 19, which caused the sudden arc, is improved to a certain degree. Thus, the advantageous effect of the object of the present disclosure can be achieved.

INDUSTRIAL APPLICABILITY

In accordance with the present disclosure, in an arc welding method for performing welding by alternately generating a short circuit state and an arc state while feeding a welding wire as a consumable electrode, stable arc welding can be performed by continuing the feed of the welding wire only in a fixed period even in a temporary abnormal phenomenon. Thus, the arc welding method is industrially useful.

The invention claimed is:

1. An arc welding method for an arc welding apparatus of performing reciprocating wire feed so as to alternately perform forward feed for feeding a welding wire toward an object to be welded and reverse feed for feeding the welding wire in a direction opposite the forward feed and using a controller of the arc welding apparatus for alternately generating a short circuit period of a short circuit state and an arc period of an arc state between the welding wire and the object to be welded, the method comprising:
  a normal arc welding step performed by the controller of continuing the arc state for a first determination period or more during the arc period while feeding the welding wire in the reciprocating wire feed, the arc state being a condition in which an arc is created between the welding wire and the object to be welded and the first determination period being a period for determining existence of the arc during the arc period;
  a normal short circuit welding step performed by the controller of continuing the short circuit state for a second determination period or more during the short circuit period while feeding the welding wire in the reciprocating wire feed under a normal short circuit condition, the normal short circuit condition being a predetermined short circuit detected between the welding wire and the object to be welded, and the second determination period being a period for determining existence of the predetermined short circuit during the short circuit period; and
  an abnormal arc welding step performed by the controller of generating the short circuit state at a second time point, which is before a lapse of the first determination period from a first time point at which the arc state is started under an abnormal short circuit condition, the abnormal short circuit condition being a micro short circuit detected between the welding wire and the object to be welded,
  wherein, in the abnormal arc welding step, the reciprocating wire feed continues until a third time point after a lapse of a first period from the second time point,
  at the third time point, the reciprocating wire feed is interrupted and the abnormal arc welding step is completed,
  from the third time point, the welding wire is decelerated and the reciprocating wire feed is restarted,
  in normal reciprocating wire feed, a feeding amount of the welding wire in decelerating forward feed is set to a reference feeding amount, and
  the first period is set so that a feeding amount of the welding wire from the second time point to time when wire feeding speed first becomes zero after the third time point is equal to the reference feeding amount, and
  wherein the first determination period is set to approximately 20% to 50% of the arc period or approximately 10% to 25% of a cycle of the wire feeding speed,
  in the normal reciprocating wire feed, the feeding amount of the welding wire in the decelerating forward feed is set to the reference feeding amount, and
  the first period is set so that the feeding amount of the welding wire when the wire feeding speed first becomes zero after the second time point and through the third time point is equal to the reference feeding amount.

2. The arc welding method of claim 1, wherein
  in the normal arc welding step, a welding current whose maximum value is a first peak current value flows between the welding wire and the object to be welded, and
  in the abnormal arc welding step, a welding current whose maximum value is a second peak current value smaller than the first peak current value flows between the welding wire and the object to be welded.

3. The arc welding method of claim 1, wherein the first period ranges from 250 microseconds to one millisecond inclusive.

4. The arc welding method of claim 1, wherein the reciprocating wire feed periodically changes the feeding speed of the welding wire in a predetermined cycle at a predetermined amplitude.

5. The arc welding method of claim 1, wherein the reciprocating wire feed changes the feeding speed of the welding wire in a sine waveform in a predetermined cycle at a predetermined amplitude.

6. The arc welding method of claim 4, wherein each of the first determination period and the second determination period is approximately 25% to 50% of the predetermined cycle.

7. The arc welding method of claim 1, wherein the first period is set to a length that is a period in which a next short circuit occurs certainly.

8. An arc welding method for an arc welding apparatus of performing reciprocating wire feed so as to alternately perform forward feed for feeding a welding wire toward an object to be welded and reverse feed for feeding the welding wire in a direction opposite the forward feed and using a controller of the arc welding apparatus for alternately generating a short circuit period of a short circuit state and an arc period of an arc state between the welding wire and the object to be welded, the method comprising:
  a normal arc welding step performed by the controller of continuing the arc state for a first determination period or more during the arc period while feeding the welding wire in the reciprocating wire feed, the arc state being a condition in which an arc is created between the welding wire and the object to be welded, and the first determination period being a period for determining existence of the arc during the arc period;
  a normal short circuit welding step performed by the controller of continuing the short circuit state for a second determination period or more during the short circuit period while feeding the welding wire in the reciprocating wire feed under a normal short circuit condition, the normal short circuit condition being a predetermined short circuit detected between the welding wire and the object to be welded, and the second determination period being a period for determining existence of the predetermined short circuit within the short circuit period; and an abnormal short circuit welding step performed by the controller of generating the arc state at a fifth time point, which is before a lapse of the second determination period from a fourth time point at which a short circuit state is started under an abnormal short circuit condition, the abnormal short circuit condition being a micro short circuit detected between the welding wire and the object to be welded, wherein, in the abnormal short circuit welding step, the reciprocating wire feed continues until a sixth time point after a lapse of a second period from the fifth time point, at the sixth time point, the reciprocating wire feed is interrupted and the abnormal short circuit welding step is completed, from the sixth time point, the welding wire is accelerated and the reciprocating wire feed is restarted, in normal reciprocating wire feed, a feeding amount of the welding wire in accelerating reverse feed is set to a reference feeding amount, and the second period is set so that a feeding amount of the welding wire from the fifth time point to time when wire feeding speed first becomes zero after the sixth time point is equal to the reference feeding amount, and wherein the second determination period is set to approximately 20% to 50% of the short circuit period or approximately 10% to 25% of a cycle of the wire feeding speed, in the normal reciprocating wire feed, the feeding amount of the welding wire in the accelerating reverse feed is set to the reference feeding amount, and the second period is set so that the feeding amount of the welding wire when the wire feeding speed first becomes zero after the fifth time point and through the sixth time point is equal to the reference feeding amount.

9. The arc welding method of claim 8, wherein
in the normal short circuit welding step, a welding current having a first gradient flows between the welding wire and the object to be welded, and
in the abnormal short circuit welding step, a welding current having a second gradient gentler than the first gradient flows between the welding wire and the object to be welded.

10. The arc welding method of claim 8, wherein the second period ranges from 250 microseconds to one millisecond inclusive.

11. The arc welding method of claim 8, wherein the second period is set to a length that is a period in which next arc occurs certainly.

\* \* \* \* \*